(12) United States Patent
Nupponen

(10) Patent No.: US 10,942,841 B2
(45) Date of Patent: Mar. 9, 2021

(54) USER ASSISTED AUTOMATED TEST CASE GENERATION

(71) Applicant: Conformiq, Inc., Saratoga, CA (US)

(72) Inventor: Kimmo Nupponen, Espoo (FI)

(73) Assignee: Conformiq Holding LLC, Saratoga, CA (US)

( * ) Notice: Subject to any disclaimer, the term of this patent is extended or adjusted under 35 U.S.C. 154(b) by 127 days.

(21) Appl. No.: 16/213,055

(22) Filed: Dec. 7, 2018

(65) Prior Publication Data

US 2019/0179734 A1 Jun. 13, 2019

(30) Foreign Application Priority Data

Dec. 7, 2017 (FI) .................................. 20176093

(51) Int. Cl.
*G06F 11/36* (2006.01)

(52) U.S. Cl.
CPC ...... *G06F 11/3684* (2013.01); *G06F 11/3688* (2013.01)

(58) Field of Classification Search
CPC .......................... G06F 11/3684; G06F 11/3688
See application file for complete search history.

(56) References Cited

U.S. PATENT DOCUMENTS

| | | | | |
|---|---|---|---|---|
| 8,683,446 B2* | 3/2014 | Paradkar | ............. | G06F 11/3684 717/126 |
| 2003/0001893 A1* | 1/2003 | Haley | .................... | G06F 9/451 715/762 |
| 2004/0010735 A1* | 1/2004 | Paternostro | ......... | G06F 11/3684 714/38.14 |
| 2006/0218513 A1* | 9/2006 | Dozorets | ................. | G06F 30/33 716/106 |
| 2019/0179734 A1* | 6/2019 | Nupponen | .......... | G06F 11/3684 |

OTHER PUBLICATIONS

Why Automate Test Design? 2015. Conformiq, Inc.*
Conformiq Creator 2 Tutorial. 2014. Conformiq, Inc.*
(Continued)

*Primary Examiner* — Kamini B Patel
(74) *Attorney, Agent, or Firm* — Patrick E. Caldwell, Esq.; The Caldwell Firm, LLC

(57) ABSTRACT

There is provided a computer-implemented method for generating verified software application tests, the method comprising: acquiring a computer readable model representing a functionality of a software application to be tested; generating, based at least partly on the model, a test template for generating a plurality of verified software application tests, the test template comprising a plurality of data input fields for data values and defining data value constraints for the data values; obtaining user data input regarding a data input field; determining whether said user data input defines a data value of the data input field according to the data value constraints; in response to determining that said user data input does not define a data value according to the data value constraints, adjusting one or more data values of the test template such that said data value constraints are met; and generating, based on the test template, at least one software application test meeting the data value constraints.

20 Claims, 6 Drawing Sheets

(56) References Cited

OTHER PUBLICATIONS

Case Study: Financial Institution Deploys Conformiq 360○ Test Automation to Test at the Speed of Agile Development. 2015. Conformiq.*
Getting Started with Conformiq Creator. Nov. 21, 2014. Conformiq, Inc.*
White Paper on Test Automation Framework Using MBT. Dec. 2013. HCCL Technologies, Ltd.*
A Conformiq Technology Brief the Conformiq Approach to Algorithmic Test Generation. 2011. Conformiq, Inc.*

* cited by examiner

USER ASSISTED AUTOMATED TEST CASE GENERATION

TECHNICAL FIELD

The invention relates to testing solutions. Particularly, the present invention relates to solutions for testing software.

BACKGROUND

Testing applications are used to test software. For example, when software is developed, it may be beneficial to apply one or more tests to validate and verify that the developed software functions according to the expectations defined by the specification and/or the requirements before launch. Known solutions seem to be restricted to fully automated test case generation or they heavily rely on manually provided input data by the user. Hence, it may be beneficial to provide solutions that enable combining these methods in a novel and inventive manner.

BRIEF DESCRIPTION

According to an aspect, there is provided the subject matter of the independent claims. Some embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following embodiments will be described in greater detail with reference to the attached drawings, in which.

DETAILED DESCRIPTION OF SOME EMBODIMENTS

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments. The embodiments are not restricted to the system given as an example but a person skilled in the art may apply the solution to other systems provided with necessary properties.

Figure 1:
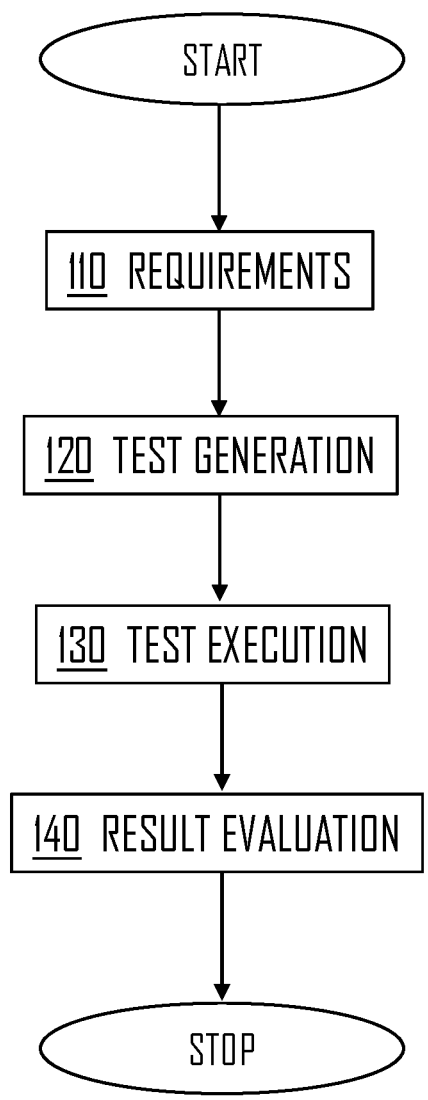
FIG. 1 illustrates a software testing protocol to which the embodiments of the invention may be applied.

FIG. 1 illustrates an example diagram of software testing process to which the embodiments may be applied. Referring to FIG. 1, a testing process may comprise obtaining requirements for testing (block 110), the requirements being formal or informal (e.g., whiteboard markings, etc.). Based on the requirements, tests are generated (block 120). The generated tests are executed (block 130) to test a software application that fulfils the requirements of block 110. The generated tests are executed in one way or another (e.g., automatic, partially automatic, or fully manually). Results are evaluated in block 140 based on the executed tests. The testing process may comprise jumping from one of the steps (110, 120, 130, 140) to a previous step. For example, after a failed test execution, amendments may be performed to the application, to the requirements, or to the generated tests (or artifacts from which the test are generated), and executed again. In another example, once the requirements change, the requirements are updated, new tests generated, the new tests executed, and results evaluated.

Predominantly, especially in the context of automatic or semi-automatic test generation, the generated tests (i.e., test generation 120) are hard-coded, meaning that once a software developer has generated the test, its values cannot be changed without altering code of the test. As the software application is modified (e.g., different versions), the generated tests may become invalid or redundant. Moreover, although the tests would be generated in such manner that they could handle different versions of the software application, they normally comprise certain fixed values to perform a certain needed function test. The fixed values could in this scenario be replaced with entities such as placeholders that could allow user to later on fill in concrete data values realizing a form of data-driven testing. However as the test cases are generated using model logic, a setup that does not automatically ensure consistency relation between the generated test cases or test flows and the separately provided concrete data exposes a disconnect between the test flows and the test data making the whole approach impractical and error prone due to the fact that the correctness and validity of the data is left entirely to the user. This makes existing approaches fragile, error prone, impractical, and tedious to use. One example may be log-in function that may be tested by giving a username and a corresponding password. Now, the generated test normally comprises test credentials with a hard-coded username and password. However, such approach may leave some parts of the log-in function untested as the tester performing said test may not have the permissions, knowledge, and/or the time to open application code and change the username/password combination. For example, special characters in the username or in the password may not work as expected. Moreover, the tester performing the test may not know how to change the test data values as (s)he may not have generated the test. Hence, even if the tester would like to test different values, (s)he may not be able to do so due to time critical test process. Naturally, there may be plurality of different tests with similar possible problems regarding hard-coded and/or hard-set test values. Hence, there may be need to develop solutions which enhance generation of verified tests for testing software application(s).

Figure 2:
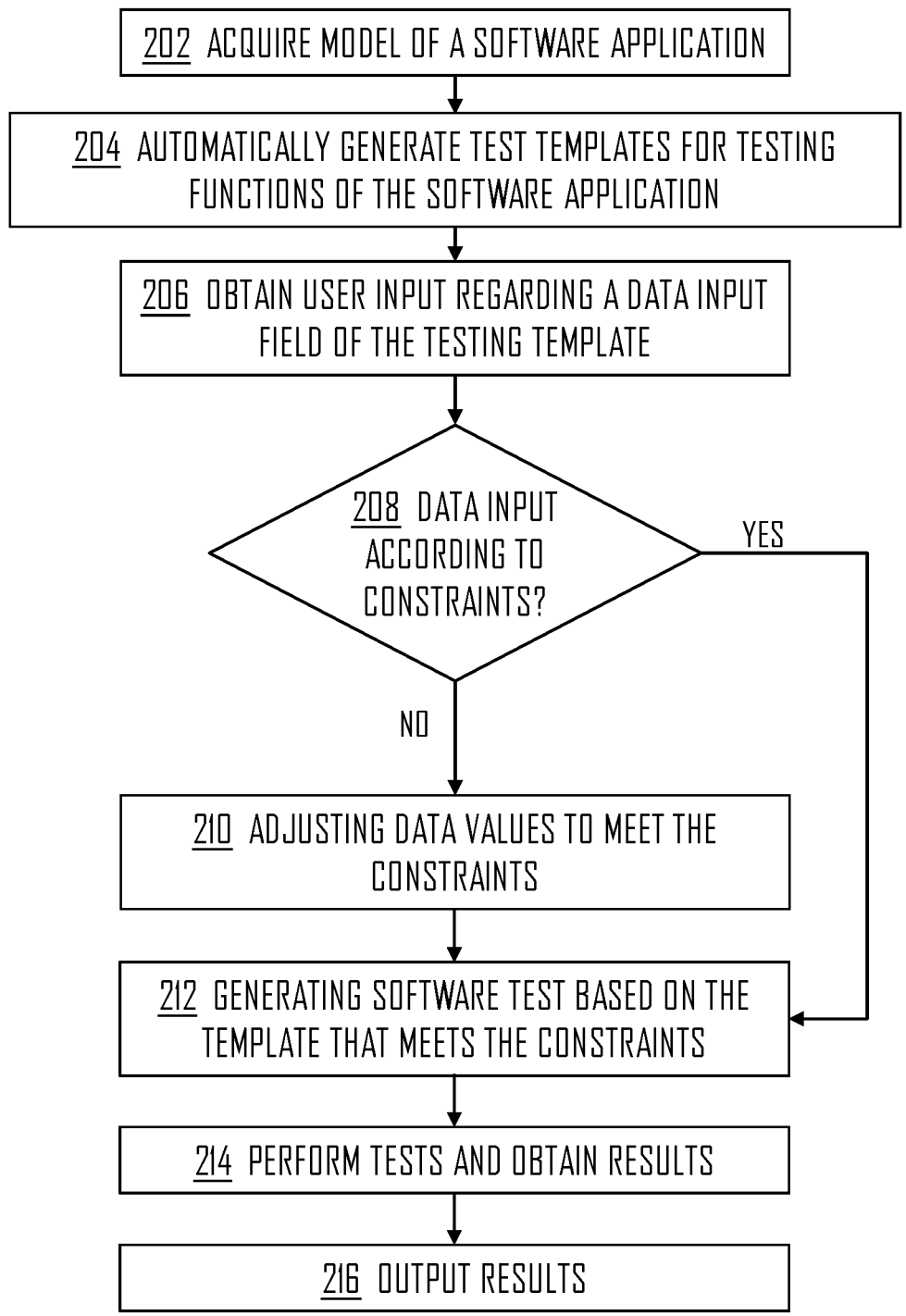
FIG. 2 illustrates a flow diagram according to an embodiment.

FIG. 2 illustrates a flow diagram according to an embodiment. Referring to FIG. 2, a computer-implemented method for generating verified software application tests is provided, the method comprising: acquiring a model representing functionality of a software application to be tested (block 202); automatically generating, based at least partly on the model, a test template for generating a plurality of verified software application tests, the test template comprising a plurality of data input fields for data values and defining data value constraints for the data values, the data value constraints for the data values being automatically determined based on the model (block 204); obtaining user data input regarding a data input field of the test template (block 206);

determining whether said user data input defines a data value of the data input field according to the data value constraints (block 208); in response to determining that said user data input does not define a data value according to the data value constraints, adjusting one or more data values of the test template such that said data value constraints are met (block 210); and generating, based on the test template, at least one software application test meeting the data value constraints (block 212).

Further, in block 214, the method may comprise causing performing of said at least one software application test, and in block 216 causing outputting results of said performed at least one software application test.

Alternatively or additionally, in an embodiment, in response to determining that said user data input does not define a data value according to the data value constraints, rejecting said user data input. For example, if said data input does not define a data value according to the data value constraints regarding said data value, the input may be rejected. In case the user data input defines data value according to the data value constraints, the process may continue directly from block 208 to block 212. However, the process may comprise performing the determination of block 208 to more than one user data input or data values in general.

The software application model acquired in block 202 may have certain features. The models may be computer readable. Models can be created manually by the user, they can be fully generated from various assets, or they can be created by partially by hand and partially generated. For example, the user may generate the model of the software application. Said model may be a formalization of the software application specification, i.e., the model may describe how the software application actually works. The model typically describes some aspect of the application to be tested, the testing environment, the expected usage of the application, the expected external behavior of the application (that is, they are formalizations of the software application specification), and/or test scenarios, etc.

In an embodiment, the model represents and/or describes a software application. In an embodiment, the model represents and/or describes a part of a software application. In an embodiment, the model represents and/or describes one or more functions of a software application.

In an embodiment, the model represents an environment of the software application. For example, the model may describe operation of one or more interfaces. For example, the software application may interface with another application or physical entity (e.g., a port). Thus, the model may describe the operation of the external application and/or entity as experienced by the software application to be tested.

In an embodiment, the model is automatically generated based on a system description and/or obtained software application (e.g., code of the application).

The automatic or semi-automatic test generation method (e.g., FIG. 2) may then comprise searching for interesting model locations that may represent testing goals, infer paths that lead to those interesting model locations, and export abstract test cases that each one encodes a one particular path thru model and a mechanism that allows one to further refine the test. The abstract test cases may refer to the test templates discussed with respect to block 204. That is, abstract test may be an alternative term for a test template. The interesting model locations may be used define a finite number of abstract tests; for example, an interesting model location may be an if-clause in the software application defined by the model. Hence, a test template for each (or at least some) if-clauses is generated.

Hence, the arrangement 700 (discussed later in more detail with respect to FIG. 7) may automatically generate the test template or templates based on the model. For example, the arrangement 700 may analyze the obtained model to determine or detect data values from the model. For example, the arrangement 700 may further analyze the obtained model to determine or detect one or more data constraints associated with the detected data values. In an embodiment, the data constraints may be determined such that the consistency of the model is maintained; e.g., if a data value is described as an integer in the model, the data value constraint may be used to exclude data values that are not integers. The arrangement 700 may detect these automatically, and automatically generate the test templates by analyzing the model as described above and hereinafter. In an embodiment, the data value constraint(s) define an upper bound and/or lower bound for a data value and/or data values. For example, regarding a data input field, the constraint(s) may define that a data value of said data input field (e.g., inputted by a user) should be between A and B, wherein A and B are values. The data value constraints may define different ranges. For example, a data value may need to be equal to or greater than X, wherein X is a value. For example, a data value may need to be equal to or less than Y, wherein Y is a value.

The test templates (or abstract tests or abstract test cases) generated in block 204 may be generated using at least three different approaches: graphical test scenario modelling, which consists of modelling the test cases themselves in a graphical notation; environment/usage modelling, which describes the expected environment of the application; or system modelling where the model represents the actual, desired behavior of the system itself. The first two approaches represent the point of view of the tester—not the system that is being tested. That is, these models describe how the application is used, and how the environment around the application operates. The models may include testing strategies, that is, the input selection, and handcrafted output validators, or test oracles. A third approach may be a system model driven test generation approach, which may automatically generate both test strategies and test oracles, possibly making the use of such an approach more straightforward and less error prone as the process of designing these may be totally omitted.

So, the test templates may be used to generate software application tests (or simply tests generated based on the test templates) for testing certain model locations, such as if-clause. Now, the test template comprises certain data value constraints, i.e., set of rules, which define what criteria needs to be fulfilled in order to test certain paths of the model. As described, the set of rules may be automatically generated by analyzing the model. For example, the test template may need to handle both options: the condition in if-clause is true and if is false (i.e., not true). In another example, a test template is for testing a certain function of the model. A test path from A to B is determined to require values X and Y, with further constraints that X is equal to or greater than zero and Y is X+1. If these conditions are met, the test template may be used to generate a plurality of tests which lead from A to B (e.g., if-clause is true).

Figure 7:
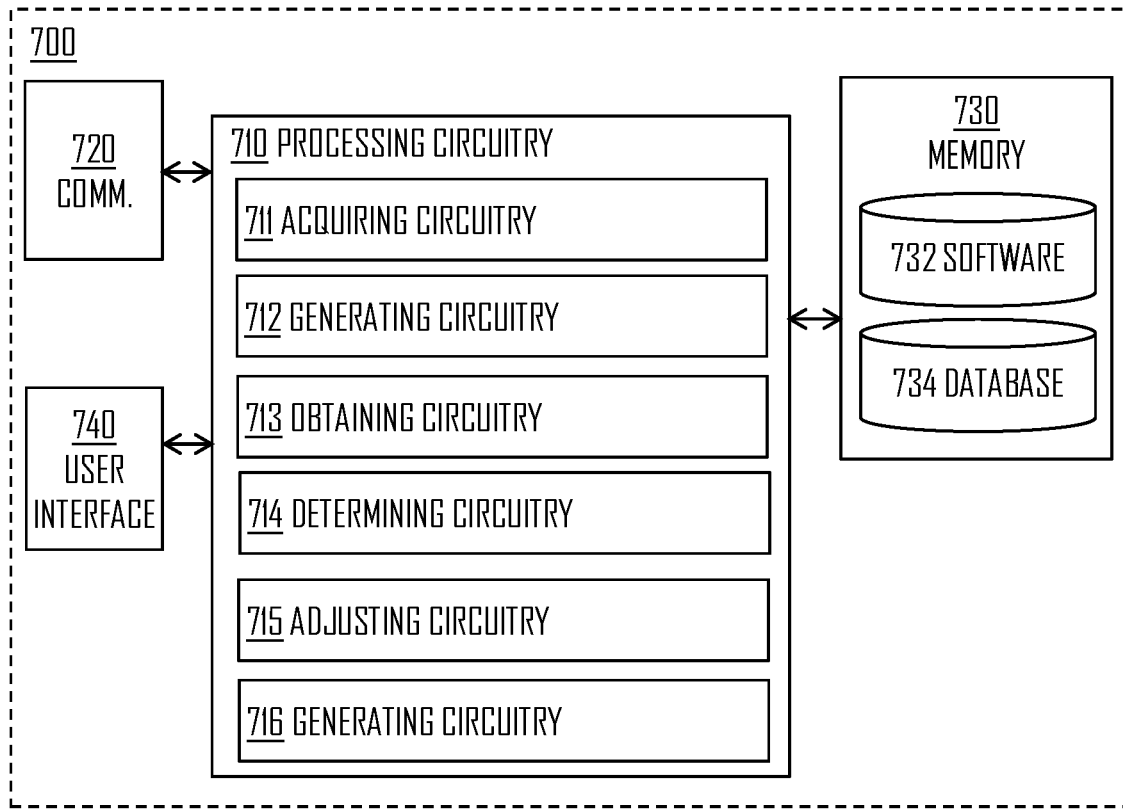
FIG. 7 illustrate an arrangement or a system for verifying test configuration.

FIG. 7 illustrates an arrangement 700 for performing the method according to FIG. 2 and/or embodiments thereof. The arrangement 700 may be partially or fully comprised in an apparatus, such as a computer (e.g., server computer), for example. According to an embodiment, the arrangement 700 carrying out the embodiments comprises a processing circuitry 710, including at least one processor, and at least one memory 730 including computer program code 732. When activated, the at least one processor and the at least one memory 730 causes the apparatus to perform at least some of the functionalities according to any one of the embodiments.

The arrangement 700 may comprise a communication circuitry 720 for wired and/or wireless communication. For example, the communication circuitry 720 may be used to obtain software application models from an external source, for example. For example, the memory 730 may comprise a database 734 for storing models. The database 734 may be external or part of the arrangement 700.

The arrangement 700 may comprise a user interface 740 for inputting data to and/or outputting data from the arrangement 700. For example, the user interface 740 may be used to input the models, by the user, to the arrangement 700. On the other hand, the user interface 740 may be used to enable the user to input and/or adjust data values of the test template (e.g., data input fields). The user interface 740 may include keyboard(s), microphone(s), display(s), pointer(s) (e.g., mouse), and the like. The user interface 740 may enable different kinds of interaction possibilities. For example, data values can be read/extracted from numerous sources: they can be inputted by the user (even in ad hoc fashion for experimentation), they can be collected from test data databases, from bug tracking systems, from explicit data design efforts, from data provisioning/management tools and databases, etc. The User Interface 740 (UI) may thus refer to capability to deal with such sources and/or targets.

According to an embodiment, the processing circuitry 710 comprises at least one of circuitries 711, 712, 713, 714, 715, and 716. Referring to FIG. 7, the acquiring circuitry 711 may be configured at least to perform operations of block 202 of FIG. 2. The generating circuitry 712 may be configured at least to perform operations of block 204 of FIG. 2. The obtaining circuitry 713 may be configured at least to perform operations of block 206 of FIG. 2. The determining circuitry 714 may be configured at least to perform operations of block 208 of FIG. 2. The adjusting circuitry 715 may be configured at least to perform operations of block 210 of FIG. 2. The generating circuitry 716 may be configured at least to perform operations of block 212 of FIG. 2.

It is also noted that the arrangement 700 may, according to an embodiment, be at least partially realized as a virtual arrangement running on physical resources, i.e., a logical entity for which resources are provided by a plurality of distributed entities. For example, the functionalities of the arrangement 700 may be realized by one or more virtual machines running on one or more physical computers. Such arrangement may provide even more flexible operating environment.

In one example, the test template or templates is a generated software program that encodes test scenarios and embeds an engine for testing data refinements (e.g., user input). Each test template may have a user interface for allowing the user to make said refinements to data values. Refinements may refer to the user input and/or selection regarding one or more data input fields. The refinements may be then verified and validate by said engine (i.e. data constraints are verified to be met). Each data refinement may have an impact on other data values on the given test scenario, and said engine may propagate the effect of data refinement in order to maintain the consistency of test. Said test template may be configured to reject invalid data refinements and valid refinements are accepted and concrete test cases can be exported with valid data values.

Figure 8:
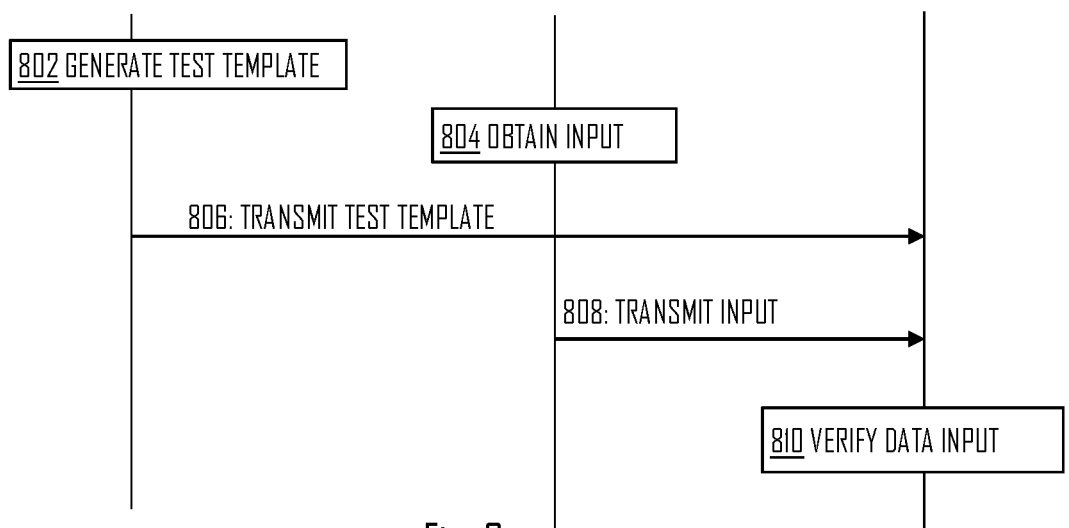
FIG. 8 illustrates a signal diagram according to an embodiment.

FIG. 8 illustrates a signal diagram according to an embodiment. Referring to FIG. 8, the generating circuitry 712 may generate one or more test templates (block 802) based on the software application model. The generating circuitry 712 may be comprised in a test generator or referred to as a test generator. The generated test template may comprise one or more values that may be adjusted or inputted by the user. Hence, in block 804 (e.g., corresponding to step 206) the obtaining circuitry 713 may obtain user input for one or more of said fields. Both the test template and its values may be transmitted to the determining circuitry 714 as utilizing one or more electrical signals (blocks 806 and 808). For example, an electrical signal may be used to carry the generated test template with the values within the arrangement 700.

The determining circuitry 714 may then (e.g., after receiving and/or in response to obtaining the test template and/or user input) verify the user input (block 810), e.g., by performing one or more algorithms to verify that the data constraints are met. The user input, as shown in FIG. 8: block 810, may be referred to as data selection at least in some embodiments. Data selection may refer to cases wherein the user provides the input by selecting a certain value or values within a provided range. The selection may comprise selecting the value(s) amongst a plurality of predetermined values.

Once the data input or selection has been verified, the software application test(s), based on the test template, may be generated for later use or run immediately (e.g., in response to generating the verified tests). Verified test(s) may refer to software application tests that are determined to have values that meet the one or more constraints. For example, a test template may be understood as a test that cannot be performed without providing/adjusting the data values of the test template. Hence, the test template may also be referred to as an abstract test. Once the data values are provided, the concrete test(s) (i.e., software application test) may be generated based on the test template and run/executed. On the other hand, the test template may comprise initial data values that meet the one or more data value constraints. The arrangement 700 may generate such initial data values. Once the user adjusts one or more of said data values via the data input fields, the arrangement 700 may perform one or more checks to verify that the data input(s) (e.g., data selections) meet said one or more constraints. If not, the data values may be adjusted automatically without user's further input and/or reject the inputted value that does not meet the data value constraint(s). On the other hand, the arrangement 700 may prompt the user to verify that adjusting the data values is accepted.

Regarding circuitry 712 and step 802, the test generator may be configured to obtain the software application model and automatically analyze the model in order to generate the test template or templates. That is, the test generator, or some similar functionality or entity of the testing system, may analyze the obtained model. Analyzing may comprise analyzing and/or going through the model. The analyzing may comprise detecting one or more values and/or parameters in the model. The analyzing may further comprise detecting one or more data constraints for one or more detected values. The test generator may thus generate the test template(s) such that a test template comprises a data input field, e.g., for each detected data value that is enabled to be modified, and one or more data constraints associated with the data input field.

Purely as an example, the test generator may find if-clauses from the model and determine values which lead to true and which lead to false scenarios. For example, for one if-clause, the test generator may determine, by analyzing the model (e.g., software code or pseudo representation of the code) values which make the if-clause be true and which make the if-clause be false. At least two different test templates may be generated: one for if-clause being true and another for if-clause being false. For example, a condition in an if-clause may be X<Y. Therefore, it is possible to generate more than one verified software application test from the same test template which make said condition true (e.g., X=1, 2, 3, or 4; and Y=5) and more than one verified software application test from the same test template which make said condition false (e.g., X=6 or 7; and Y=5). Accordingly, values constraints may be generated such that the true and false scenarios are obtainable. So, for example, for a test template for testing if-clause being false, the value constraints may be such that the if-clause should always return false. So, values which should lead to if-clause returning true should be rejected (block 304) and/or adjusted (block 404). However, for example, for a test template for testing if-clause being true, the value constraints may be such that the if-clause should always return true. So, values which should lead to if-clause returning false should be rejected (block 304) and/or adjusted (block 404).

Benefits of the present solution are unambiguously clear for the skilled person. First of all, a need to rewrite or adjust code of the tests may be reduced or totally removed as the data values may be changed via the templates. Second of all, the tests may be verified so that the results of the test may be more reliable. For example, let us consider a case in which a hard-coded test is recoded. The tester may perform this by hand and possibly using some sort of specification as a back-up. However, there may be no verification that the recoded test is validly amended. Hence, the hard-coded test needs to be further somehow validated/verified. However, in the present solution the data value constraints may be generated once which are determined and/or verified to be made according to the needed test, i.e. if data values fulfil said data value constraints, the generated test may be verified. So, when generating new tests based on the test template, there may be no need to further validate the data values as the test template's data value constraint already takes this into account. So, the presented solution may enable adoption in a process where test design is divided into separate test flow and test data design; may enable an integration with combinatorial test data and other testing tools by frontending the tool, fully circumventing the need to create a separate "model" for the tool by simply serial- izing the test template produced by this approach in the format expected by the testing tool; may provide answers to the question where users expect to have more control over the data selection process, enable means of experimenting with different data values, and enables a way to easily utilize expert/domain knowledge in test design; may enable the use of production data by instantiating the test templates fully automatically by the production data; and/or may enable automatic validation of the data consistency, preventing creation of SW application tests that are internally inconsistent in terms of the test flow (i.e., the control flow/path to be tested) and the data.

Figure 3:
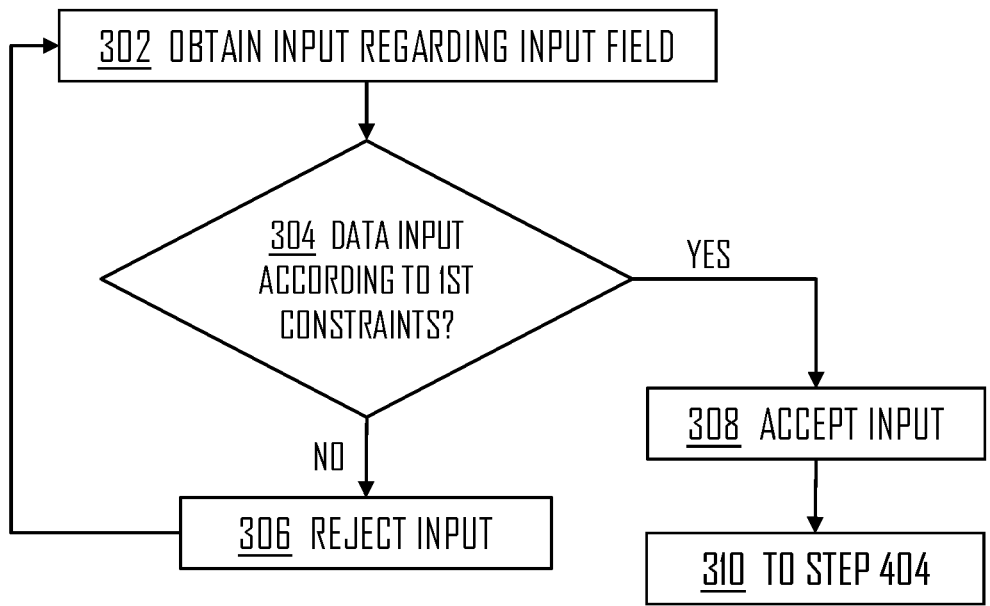
FIGS. 3 and 4 illustrate some embodiments.
Figure 4:
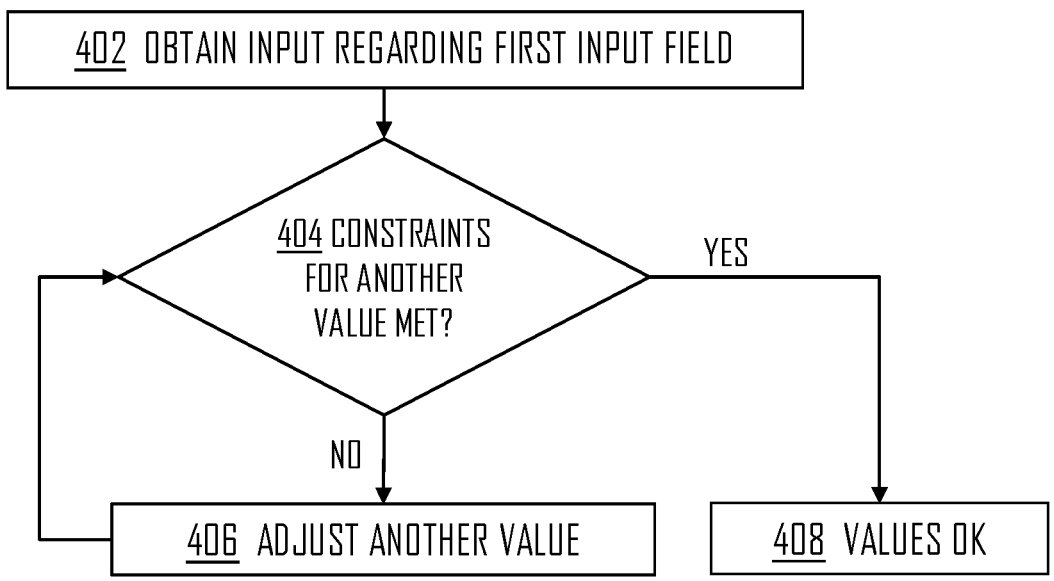

Referring now to FIGS. 3 and 4 illustrating some embodiments and describing how the different value constraints may be utilize. Referring to FIG. 3, in block 302, the arrangement 700 (i.e., circuitry of the arrangement) may obtain data input regarding a data input field of the generated test template (i.e., block 302 may correspond to block 206). The arrangement 700 may determine, in block 304, whether said user data input defines a data value of the data input field according to a data value constraint (e.g., first data value constraint) regarding said data input field. For example, if X needs to be between 1 and 10, and the user defines a value of 11, the value constraint may be violated. In response to determining that said user data input defines a data value according to the data value constraint regarding said data input field, the user input may be accepted (block 308). Otherwise, the user input may be rejected (block 306). Rejecting may mean that the initial value of said data input field is maintained and/or a new input is requested from the user (e.g., as indicated with an arrow). According to an embodiment, the new input is requested as long as the inputted value is rejected. That is, once a valid input is provided, the input may be accepted and the process may continue to block 308. Said determination of block 304 may be performed for each data field that is associated with a user inputted value. The determination may be performed in response to obtaining a user input regarding a certain field or fields of the test template.

Referring to FIG. 4, independently or in combination with the process of FIG. 3, the arrangement 700 may determine (block 404) whether said user data input (e.g., input in block 302 or in block 402) defines a data value of the data input field according to a data value constraint (e.g., a second data value constrain) regarding at least one other data value of the test template. For example, said data value constraint may define constraint regarding an association between inputted data value (e.g., block 402) and said at least one other data value of the test template. So, for example, if a data value input meets data value constraints (e.g., block 304), the arrangement 700 may further determine that data value constraints regarding some other data value of the test template is also met. For example, if user inputs value of X, the arrangement may determine whether data value constraint regarding Y is also met based on inputted X value and the constraints regarding Y (block 404). Block 402 may refer to same data input as block 302 or to some other data input. In response to determining that said user data input does not define a data value of the data input field according to the data value constraint regarding said at least one other data value of the test template, the arrangement 700 may adjust said at least one other data value to meet the data value constraint regarding said association (block 406). If the data value constraint is met (block 404), the values of the test template may be determined to meet the data value constraints (block 408), and thus the generation of actual concrete tests based on the test template may be initiated. Hence, verified software application test(s) may be obtained that meet the value constraints.

So, for example, if in block 302 a user input regarding a first input field is obtained, the arrangement 700 may first determine whether said input is made according to the first data value constraints (block 304). For example, it is determined whether X is between 1 and 10. If this is true, the arrangement 700 may accept the input regarding X. The process may then continue to step 404 in which the arrangement 700 may determine whether the second data value constraint is met regarding one or more different data fields. For example, if the test template comprises data fields for X and Y, in block 404 the arrangement 700 may determine whether inputted X value meets value constraints regarding Y and/or whether Y value meets value constraints regarding Y. For example, the constraints may define that Y is X+1. Hence, if this constraint is not initially met, the arrangement

700 may automatically adjust the value of Y based on the value of X and the known second constraint (e.g., X=9, Y=10; X=10, Y=11). It is also possible that value of Y (or value(s) of some other data inputs) cannot meet the second constraint even if the value of X is met (i.e., first constraint is met in block 304). In such case the arrangement 700 may indicate this to the user and/or automatically adjusts value of X such that all constraints are met. This may be based on iterative process/algorithm performed by the arrangement 700.

Once values are determined to be OK (block 408: i.e., meet the constraints), the test(s) may be generated based on the test template and run and/or exported to an external source. For example, the test(s) may be generated for manual, partially automated or fully automated execution, or for test documentation. For example, the exported tests may be stored to a database for later use. For example, the exported tests may be transmitted via one or more electrical signals from the arrangement 700 to the external source, such as the database 734.

In an embodiment, said at least one other data value adjusted in block 406 comprises a data value of another data input field configurable via user input. So, for example, both X and Y values may be adjusted by the user. However, in an embodiment, the arrangement 700 is configured to automatically prevent adjusting a data value of a data input field inputted by a user. So, for example, if user inputs a value of X that meets the data constraints of block 304, the arrangement 700 may determine whether the second data constraints in block 404 are met. If not, the arrangement 700 may adjust some other value than the inputted X value. In another example, if there are X, Y, and Z values in the test template and X and Y are inputted, but some constraint is not initially met, the arrangement 700 may adjust value Z (as adjusting values of X and Y is prevented). However, if the arrangement 700 (also referred to as a system 700) determines that adjusting Z is not enough, it may indicate this to the user.

In an embodiment, block 404 is performed in response to accepting input in block 308 (i.e., the inputted data value is allowed by the arrangement 700). So, for example, if a user inputs a data value of a first data field, and the system allows said data value as it meets the data constraints, the system may further determine whether data value constraints regarding a data value of a second data field are also met. If not, the data value of the second data field may be adjusted (block 406).

According to an embodiment, blocks 208, 304, and/or 404 are performed technically by a constraint solver. The constraint solver may be realized, for example, through Satisfiability Modulo Theories (SMT) or a Constraint Satisfaction Problem (CSP) solver. For example, the determining circuitry 714 may implement and/or comprise a CSP solver or CSP solver functionality. An example code of such solver may be as follows:

```
Solve( ):
    working := TRUE
    while working ∧ ¬Happy( )
Preprocess( )
        Propagate( )
        if ¬Happy( )
            if Atomic( )
                working := FALSE
            else
                Split( )
                ProceedByCases( )
```

Figure 5A:
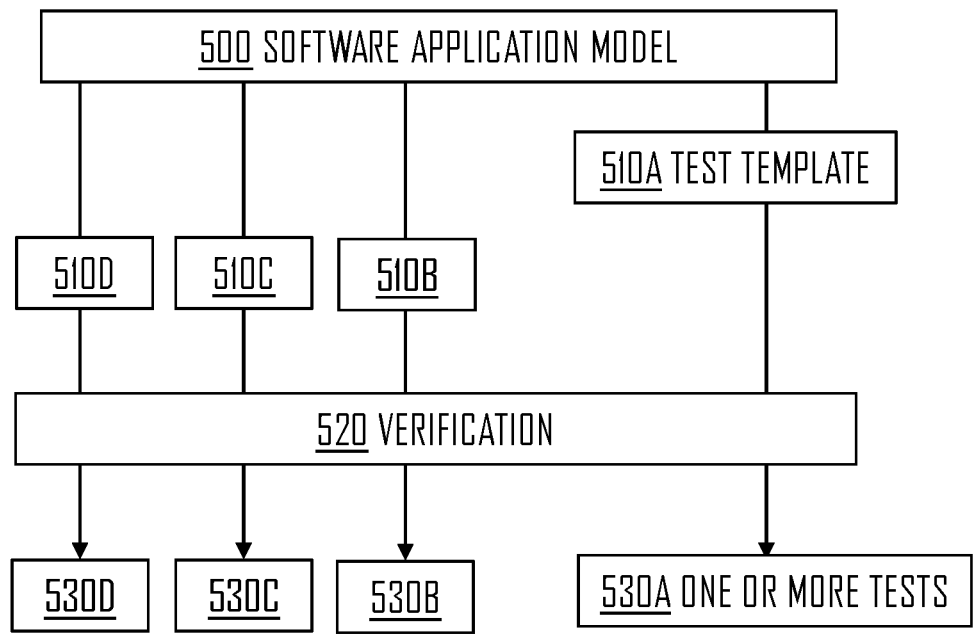
FIGS. 5A, 5B, and 5C illustrate some embodiments.
Figure 5B:
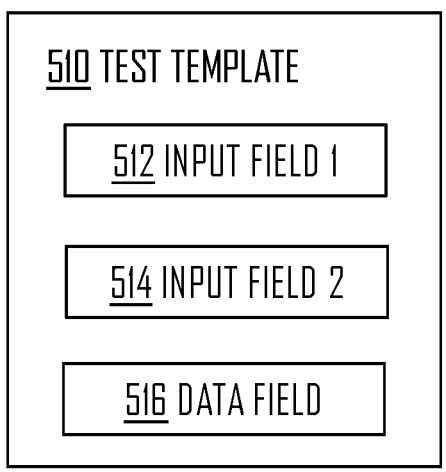
Figure 5C:
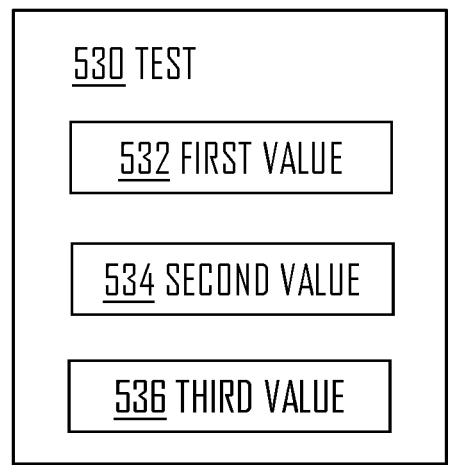

So, we have now discussed how a model of a software application may be obtained (e.g., generated by the user), how tests templates (or abstract tests) may be generated based on the model, how user may interact with the template (i.e., change values), how the system may check how the values meet different constraints, and generating the concrete test cases or tests based on the test template(s) that meet the value constraints. The concrete tests may then be generated according to the restrictions of the model, and thus may be used, by the arrangement 700 or some other entity, to test the software application or simulate the model. That is, features and/or functions needed or selected may be tested (e.g., if-clauses). Let us then look at FIGS. 5A to 5C illustrating some embodiments. Referring to FIG. 5A, it is shown that the arrangement 700 may generate one or more test templates 510A-D (i.e., abstract tests) based on the software application model 500, verify the data values (e.g., inputted data values) of each template 510A-D and enable generation of one or more test (i.e., concrete tests) 530A-D after verification 520 that the values of the templates 510A-D are correct. For example, test template 510A may be used to generate two verified tests 530A: a first test having X value of 9 and Y value of 10, and a second test having X value of 8 and Y value of 9, for example. Naturally, X and Y values need to be understood as non-limiting and simple examples of possibly complex data value constraints.

In FIG. 5B, a test template 510 representing any one of templates 510A-D is shown. The test template 510 may comprise one or more input fields 512, 514 for the user to input data values. The test template 510 may further comprise one or more data fields 516 (no user input allowed, for example). When the user inputs data, each data field and input field may be verified to meet the data constraints by the arrangement 700.

In FIG. 5C, a test 530 representing any one of tests 530A-D is shown. The test 530 may comprise a plurality of data values 532, 534, 536, which may be according to data constraints. For example, first value 532 may be the value inputted via input field 1 (reference sign 512), second value 534 may be the value inputted via input field 2 (reference sign 514), and/or the third value 536 may correspond to value of the data field 516. Different tests 530 and different test templates 510 may have different number of data fields, input fields and/or data values as understood by the skilled person.

According to an embodiment, the test 530 comprises a unique identifier identifying the test 530 among a plurality of test. The unique identifier may be transmitted among the test 530 from the arrangement 700 to an external target (e.g., database), or within the arrangement 700 from, for example, test generator to a test executer.

According to an embodiment, the test template 510 comprises a unique identifier identifying the test template 510. The unique identifier may be transmitted among the test template 510 from the arrangement 700 to an external target (e.g., database), or within the arrangement 700 from, for example, circuitry 712 to determining circuitry 714 (message 806 of FIG. 8). Furthermore, the model (i.e., software application model) may be associated with a unique identifier. Hence, the model may be linked to the test templates for testing said model in database, for example.

Figure 6:
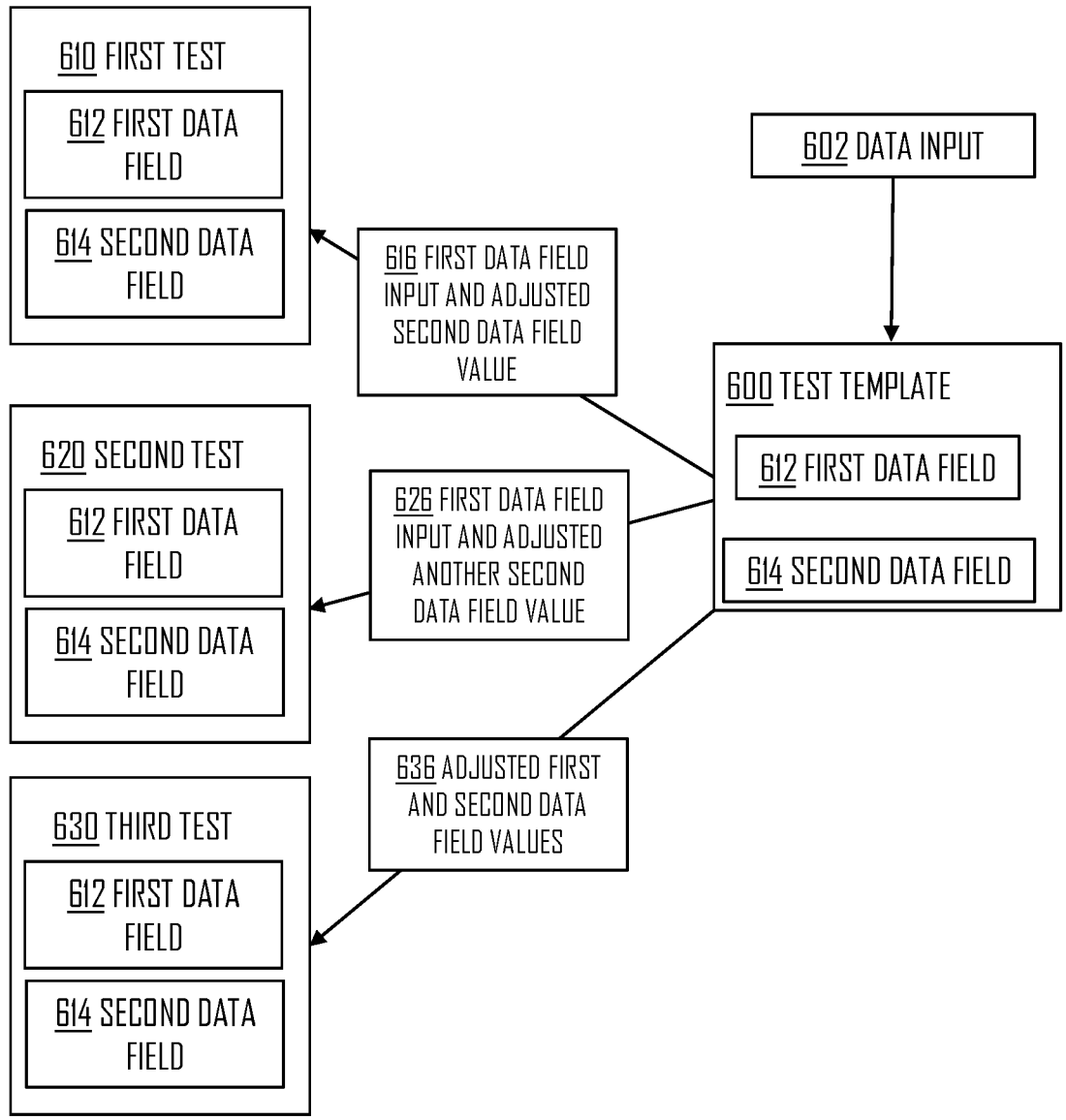
FIG. 6 illustrates an embodiment.

FIG. 6 illustrates some embodiments. Referring to FIG. 6, a plurality of software application tests 610, 620, 630 are generated based on the same test template 600 by the arrangement 700. The test template 600 may be similar to the test template 510, for example. The test template 600 may comprise one or more data fields 612, 614 (e.g., first data field 612 and a second data field 614). The user may provide data input 602 to the data field(s) 612, 614, and the tests 610, 620, 630 may be generated based on the test template 600 and the inputted value(s) (i.e., data input 602).

For example, the plurality of tests 610, 620, 630 may comprise a first test 610, a second test 620, and a third test 630, wherein each test has the first data field 612 and the second data field 614. That is, each test 610, 620, 630 may have the same data fields 612, 614 as the test template 600. However, each test may have different or same values in the data fields 612, 614 compared with other tests. For example, first data field 612 of the first test 610 may have a different value than the first data field 612 of the third test 630.

Accordingly, the user may provide data input 602 to the test template 600 regarding, for example, the first data field 612. The system 700 or arrangement 700 may automatically verify the data input (i.e., check that the data value constraint(s) are met). The system 700 may further generate or adjust value of the second data field 614, wherein said value meets the data constraint(s) regarding said test template 600. Based on the inputted and/or adjusted values which meet the data constraints, the plurality of tests 610, 620, 630 (i.e., software application tests) are generated.

For example, the user may provide the data input 602, wherein the data input 602 defines value of the first data field 612. The system 700 may adjust or generate value of the second data field 614 such that the value of the second data field 614 meets the constraints regarding the inputted value of the first data field (e.g., X=9, and Y=X+1, so Y is adjusted to be 10). Based on the data input and the adjustment, the first test 610 may be generated.

In an embodiment, said plurality of software application tests comprises a second test 620 having the value of the first data field 612 inputted by the user and an adjusted value of the second data field 614, wherein both data values meet the data value constraints. For example, the arrangement 700 may automatically generate an alternative for the value of the second data field 614 that meets the data value constraints. For example, if X=9 and Y needs to be greater than X, value of the second data field 614 of the first test 610 could be 10 and of the second data field 614 of the second test 620 could be 11. That is, the alternative for the second data field 614 may be different between tests 610, 620, but still meet the data value constraints. The value of the first data field 612 may be the same for both tests 610, 620.

In an embodiment, a third test 630 is generated such that the values of the first and second data fields 612, 614 are both different compared with the first and second tests 610, 620. Hence, also the inputted value of the first data field 612 may be automatically adjusted by the system 700 to provide alternative values for the testing process.

Referring still to FIG. 6, each software application test 610, 620, 630 of the plurality of tests generated based on the test template (i.e., same test template) may have the same data fields (e.g., first data field 612 and a second data field 614). Thus, for example, the first data field 612 may comprise the same value regarding the first and second tests 610, 620, and a different value regarding the third test 630. Accordingly, for example, the second data field 614 may comprise a certain value regarding the first test 610, a different value regarding the second test 620, and another value regarding the third test 630. For example, the first data field may be for username and the second input may be for password. Hence, for example, the username may differ between the tests 610, 620, 630 as long as the test comprises a valid password. It is noted that one user may have more than one valid password in the example. However, this may not be necessary.

Still referring to FIG. 6, blocks 616, 626, and 636 illustrate examples on how the data values of the first and second data fields are provided for each test 610, 620, 630. That is, in block 616, the first test 610 may be generated based on user inputted first data field value (i.e., user input in block 602) and an adjusted second data field value. In block 626, the second test 620 may be generated based on user inputted first data field value (i.e., user input in block 602 which may be the same as for the first test 610) and an adjusted second data field value, which may be different than that of the first test 610 (i.e., an alternative value which meets the data constraints). In block 636, the third test 630 may be generated based adjusted values for both the first and second data fields. As described, also in this case the arrangement 700 may generate the adjusted values based on the user input (block 602) that meet the data constraints regarding both fields.

In an embodiment, the test template 510 comprises preset data values meeting the data value constraints. The preset values may be automatically generated by the arrangement 700 based on one or more data value constraints, for example.

In an embodiment, the at least one software application test 530 is generated if the data values of the test template 510 are verified to meet the data value constraint(s). That is, the at least one software application test 530 may be generated only if the data values of the test template 510 are verified 510 to meet the data value constraint(s)

According to one example, the arrangement is for testing software of an electrical apparatus, such as user device (e.g., mobile phone or computer). The arrangement 700 may obtain the software and/or model of said software. The arrangement 700 may then be used to generate the tests as described above using the test template and the data value verification.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware.

In an embodiment, at least some of the processes described in connection with FIGS. 1 to 6 and 8 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 1 to 6 and 8 or operations thereof.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments of FIGS. 1 to 6 and 8, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g., procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 1 to 6 and 8 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A computer-implemented method for generating verified software application tests, the method comprising:
acquiring a computer readable model representing at least a functionality of a software application to be tested;
automatically generating, based at least partly on the model, a test template for generating a plurality of verified software application tests, the test template comprising a plurality of data input fields for data values and defining data value constraints for the data values, the data value constraints for the data values being automatically determined based on the model;
obtaining user data input regarding a data input field of the test template;
determining whether said user data input defines a data value of the data input field according to the data value constraints;
in response to determining that said user data input does not define a data value according to the data value constraints, adjusting one or more data values of the test template such that said data value constraints are met; and
generating, based on the test template, at least one software application test meeting the data value constraints.

2. The method of claim 1, further comprising:
causing performing of said at least one software application test; and
causing outputting results of said performed at least one software application test.

3. The method of claim 1, further comprising:
determining whether said user data input defines a data value of the data input field according to a data value constraint regarding said data input field; and
in response to determining that said user data input defines a data value according to the data value constraint regarding said data input field, accepting the user input,
otherwise rejecting the user input.

4. The method of claim 1, further comprising:
determining whether said user data input defines a data value of the data input field according to a data value constraint regarding an association between said data value and at least one other data value of the test template; and
in response to determining that said user data input does not define a data value of the data input field according to the data value constraint regarding an association between said data value and said at least one other data value of the test template, adjusting said at least one other data value to meet the data value constraint regarding said association.

5. The method of claim 4, wherein said at least one other data value comprises a data value of another data input field configurable via user input.

6. The method of claim 4, wherein said determining whether the data value meets the data value constraint regarding said association is performed in response to allowing said data value.

7. The method of claim 1, further comprising:
preventing automatically adjusting a data value of a data input field inputted by a user.

8. The method of claim 1, wherein the at least one software application test comprises a first test having a data value $d_i$ inputted by a user and an adjusted data value $d_{a1}$, wherein both data values $d_i$ and $d_{a1}$ meet the data value constraints.

9. The method of claim 8, wherein the at least one software application test comprises a second test having the data value $d_i$ inputted by the user and an adjusted data value $d_{a2}$, wherein both data values $d_i$ and $d_{a2}$ meet the data value constraints.

10. The method of claim 9, wherein the at least one software application test comprises a third test having a data value $d_{a3}$ and a data value $d_{a4}$, wherein both data values $d_{a3}$ and $d_{a4}$ are generated based on the data value $d_i$ inputted by the user and the data value constraints.

11. The method of claim 1, wherein the test template comprises preset data values meeting the data constraints.

12. The method of claim 1, wherein the at least one software application test is generated only if the data values of the test template are verified to meet the data value constraints.

13. A computer apparatus comprising:
means for acquiring a computer readable model representing at least a functionality of a software application to be tested;
means for automatically generating, based at least partly on the model, a test template for generating a plurality of verified software application tests, the test template comprising a plurality of data input fields for data values and defining data value constraints for the data values, the data value constraints for the data values being automatically determined based on the model;
means for obtaining user data input regarding a data input field of the test template;
means for determining whether said user data input defines a data value of the data input field according to the data value constraints;
means for in response to determining that said user data input does not define a data value according to the data value constraints, adjusting one or more data values of the test template such that said data value constraints are met; and
means for generating, based on the test template, at least one software application test meeting the data value constraints.

14. A computer-implemented method comprising instructions which when loaded into a computer apparatus cause the computer apparatus to:
acquire a computer readable model representing at least a functionality of a software application to be tested;
automatically generate, based at least partly on the model, a test template for generating a plurality of verified software application tests, the test template comprising a plurality of data input fields for data values and defining data value constraints for the data values, the data value constraints for the data values being automatically determined based on the model;
obtain user data input regarding a data input field of the test template;
determine whether said user data input defines a data value of the data input field according to the data value constraints;
in response to determining that said user data input does not define a data value according to the data value constraints, adjust one or more data values of the test template such that said data value constraints are met; and
generate, based on the test template, at least one software application test meeting the data value constraints.

15. The computer-implemented method of claim 14, wherein the instruction further cause the computer apparatus to:
cause performing of said at least one software application test; and
cause outputting results of said performed at least one software application test.

16. The computer-implemented method of claim 14, wherein the instruction further cause the computer apparatus to:
determine whether said user data input defines a data value of the data input field according to a data value constraint regarding said data input field; and
in response to determining that said user data input defines a data value according to the data value constraint regarding said data input field, accepting the user input,
otherwise rejecting the user input.

17. The computer-implemented method of claim 14, wherein the instruction further cause the computer apparatus to:
determine whether said user data input defines a data value of the data input field according to a data value constraint regarding an association between said data value and at least one other data value of the test template; and
in response to determining that said user data input does not define a data value of the data input field according to the data value constraint regarding an association between said data value and said at least one other data value of the test template, adjust said at least one other data value to meet the data value constraint regarding said association.

18. The computer-implemented method of claim 14, wherein the instruction further cause the computer apparatus to prevent automatically adjusting a data value of a data input field inputted by a user.

19. The computer-implemented method of claim 14:
wherein the at least one software application test comprises a first test having a data value $d_i$ inputted by a user and an adjusted data value $d_{a1}$, wherein both data values $d_i$ and $d_{a1}$ meet the data value constraints; and
wherein the at least one software application test comprises a second test having the data value $d_i$ inputted by the user and an adjusted data value $d_{a2}$, wherein both data values $d_i$ and $d_{a2}$ meet the data value constraints.

20. The computer-implemented method of claim 14, wherein the test template comprises preset data values meeting the data constraints.

* * * * *